(12) United States Patent
Hara et al.

(10) Patent No.: US 6,280,678 B1
(45) Date of Patent: Aug. 28, 2001

(54) PROCESS FOR PRODUCING MULTILAYER MOLDED ARTICLE

(75) Inventors: Takahisa Hara, Kawanishi; Masahito Matsumoto, Ibaraki; Hiromu Fujita, Ashiya; Yuji Kamiji, Yokkaichi; Hiromasa Nakatsuka, Mie, all of (JP)

(73) Assignees: Sumitomo Chemical Company Limited, Osaka; Nissen Chemitec Corporation, Ehime-ken, both of (JP)

( * ) Notice: Subject to any disclaimer, the term of this patent is extended or adjusted under 35 U.S.C. 154(b) by 0 days.

(21) Appl. No.: 08/232,418

(22) Filed: Apr. 25, 1994

Related U.S. Application Data

(63) Continuation of application No. 07/865,183, filed on Apr. 8, 1992, now abandoned.

(30) Foreign Application Priority Data

Apr. 8, 1991 (JP) .................................................. 3-075064

(51) Int. Cl.⁷ .............................. B29C 33/18; B29C 45/14
(52) U.S. Cl. ........................... 264/511; 264/266; 264/275
(58) Field of Search .................................. 264/511, 276, 264/275, 266, 316, 259

(56) References Cited

U.S. PATENT DOCUMENTS

| | | | |
|---|---|---|---|
| 4,474,725 | * 10/1984 | Sands | 264/511 |
| 4,793,784 | 12/1988 | Belleville et al. | |
| 4,793,793 | * 12/1988 | Swenson et al. | 264/511 |
| 4,923,539 | * 5/1990 | Spengler et al. | 264/511 |
| 4,944,908 | * 7/1990 | Leveque et al. | 264/511 |

FOREIGN PATENT DOCUMENTS

| | | | |
|---|---|---|---|
| 0264140 | 4/1988 | (EP) | |
| 1557441 | 1/1969 | (FR) | |
| 2486872 | 7/1981 | (FR) | |
| 2214860 | * 9/1989 | (GB) | |
| 59150741 | 8/1984 | (JP) | |
| 6058823 | 4/1985 | (JP) | |
| 61297120 | * 12/1986 | (JP) | 264/511 |
| 6244414 | * 2/1987 | (JP) | 264/511 |
| 6327222 | * 3/1988 | (JP) | 264/511 |
| 63158220 | * 7/1988 | (JP) | 264/511 |
| 6426414 | 1/1989 | (JP) | |
| 1263027 | * 10/1989 | (JP) | 264/511 |
| 2175111 | 7/1990 | (JP) | |
| 3162914 | * 7/1991 | (JP) | 264/511 |
| 9003256 | 4/1990 | (WO) | |

* cited by examiner

*Primary Examiner*—Angela Ortiz
(74) *Attorney, Agent, or Firm*—Birch, Stewart, Kolasch & Birch, LLP

(57) ABSTRACT

A multilayer molded article with good appearance is produced by supplying a skin material and a melt of a thermoplastic resin between unclosed upper and lower molds and simultaneously molding the thermoplastic resin to form a molded article and laminating the skin material on a part of a surface of the molded article by pressing and cooling the thermoplastic resin in the molds, in which the lower mold has a protruding part at a position where an edge of the skin material is located, the upper mold has a depressed part at a position corresponding to the protruding part of the lower mold, and, during molding, the edge of the skin material is fixed to the lower mold by sucking it through a gap which opens at the root of the protruding part.

13 Claims, 4 Drawing Sheets

PROCESS FOR PRODUCING MULTILAYER MOLDED ARTICLE

This application is a continuation, of application Ser. No. 07/865,183 filed on Apr. 8, 1992, now abandoned.

BACKGROUND OF THE INVENTION

1. Field of the Invention

The present invention relates to a process for producing a multilayer molded article which comprises a thermoplastic resin body and a skin material which is laminated on a part of the thermoplastic resin body.

2. Description of the Related Art

A large number of plastic molded articles are used in many fields including the automobile and domestic electric appliance fields because of their low cost, free moldability and light weight. However, they have some drawbacks that they have poor appearance and cool feeling and they tend to be easily flawed. Then, it is highly desired to impart decoration and soft feeling to the plastic molded articles. Hitherto, to impart decoration to the plastic molded article, there have been many methods for producing a partly laminated multilayer molded article comprising a thermoplastic resin body and a skin material which is laminated on a part of the thermoplastic resin.

When the partly laminated multilayer molded article is produced by supplying a rein melt between the skin material and a mold and closing the mold to press mold the article, it is important to precisely place the skin material on a desired part of the thermoplastic resin body and finish edges of the skin material with good appearance. To these ends, various molding methods have been proposed in which a measure for fixing the skin material is devised.

For example, Japanese Patent Kokai Publication No. 150741/1984 discloses a method for producing a partly laminated multilayer molded article wherein edges of the skin material are clamped with a skin material-fixing plate and a lower mold. However, by this method, it is impossible to laminate the skin material on a center part of the molded article.

Japanese Patent Kokai Publication No. 175111/1990 discloses a molding method wherein a skin material is clamped with a special jig and placed in the mold. However, this method cannot be used when the skin material has a complicated shape.

A further method is disclosed in Japanese Patent Kokai Publication No. 26414/1989, wherein a partition wall is provided on the mold surface and the skin material is placed on the mold surface with matching a parting part of the skin material with this partition wall to prevent dislocation of the skin material.

It may be possible to design a part of the mold in a telescopic form and fix the position of the skin material by sucking the skin material through a gap between the upper and lower molds. But, the edges of the skin material are simple and the molded article its loses high quality appearance.

SUMMARY OF THE INVENTION

One object of the present invention is to provide a method for producing a partly laminated multilayer molded article with no dislocation of a skin material by a simple method.

Another object of the present invention is to provide a method for producing a partly laminated beautiful multilayer molded article having high quality appearance at edges of the skin material.

According to the present invention, there is provided a method for producing a multilayer molded article which comprises the steps of supplying a skin material and a melt of a thermoplastic resin between unclosed upper and lower molds and simultaneously molding the thermoplastic resin to form a molded article and laminating the skin material on a part of a surface of the molded article by pressing and cooling the thermoplastic resin in the molds, wherein the lower mold has a protruding part at a position where an edge of the skin material is located, the upper mold has a depressed part at a position corresponding to the protruding part of the lower mold, and, during molding, the edge of the skin material is fixed to the lower mold by sucking it through a gap which opens at the protruding part or a root of the protruding part.

DETAILED DESCRIPTION OF THE PREFERRED EMBODIMENTS

As the thermoplastic resin used for forming the body of the molded article, any one of conventional thermoplastic resins which are used in compression molding, injection molding and extrusion molding can be use. Specific examples are thermoplastic resins (e.g. polypropylene, polyethylene, polystyrene, acrylonitrile-styrene-butadiene copolymer, polyamide, etc.) and thermoplastic elastomers (e.g. ethylene-propylene block copolymer, styrene-butadiene block copolymer, etc.).

The thermoplastic resin may contain at least one conventional additive, for example, a filler such as an inorganic filler and glass fiber; a pigment; a lubricant; and an antistatic agent.

Examples of the skin material to be used in the process of the present invention are woven or nonwoven fabric, a net of metal, fiber or a thermoplastic resin, a paper or a metal foil which is lined with a sheet to be sucked; and a sheet or film of a thermoplastic resin (e.g. polyolefin, polyvinyl chloride, polyamide, etc.) and a thermoplastic elastomer (e.g. polyolefin type, polyester type, polyurethane type and polyvinyl chloride type thermoplastic elastomers) and the like. These skin materials may be ornamented by uneven design such as emboss, printing or dyeing. The skin material may be made of a foam. Further, the skin material may be a laminate of two or more of them which are bonded with, for example, an adhesive.

In the molds to be used in the molding method of the present invention, the lower mold has a protruded part at the position where the edge of the skin material is located, the upper mold has a depressed part at the positions corresponding to the protruding part of the lower mold. At the protruding part or its root part, a gap opens for sucking the edge of the skin material to fix the skin material on the lower mold. In particular, when the gap opens in the protruding part, suction marks on the skin material are hidden in grooves of the molded article. Therefore, an area of the opening of each gap can be made large and the skin material can be sucked with a large suction force, so that a stiff skin material can be easily fixed to the lower mold, and the article is produced with good efficiency.

A shape of the protruding part and the depressed part is determined according to a shape of the molded article, a thickness and a design of the skin material. To finish the edges of the skin material beautifully, the protruding part has a width at its root part (a) of from 1 to 10 mm and a height (b) of 2 to 5 mm (cf. FIG. 2B).

The gap for suction which is provided at the protruding part or its root has a width of from 0.05 to 1 mm. The gaps may be provided around the protruding part continuously or partly with suitable intervals. An upstanding edge of the protruding part has a slope of at least 3 degrees from the plane of the lower mold to improve release of the molded article.

The molding method of the present invention will be explained by making reference to the drawings.

Figure 1A:
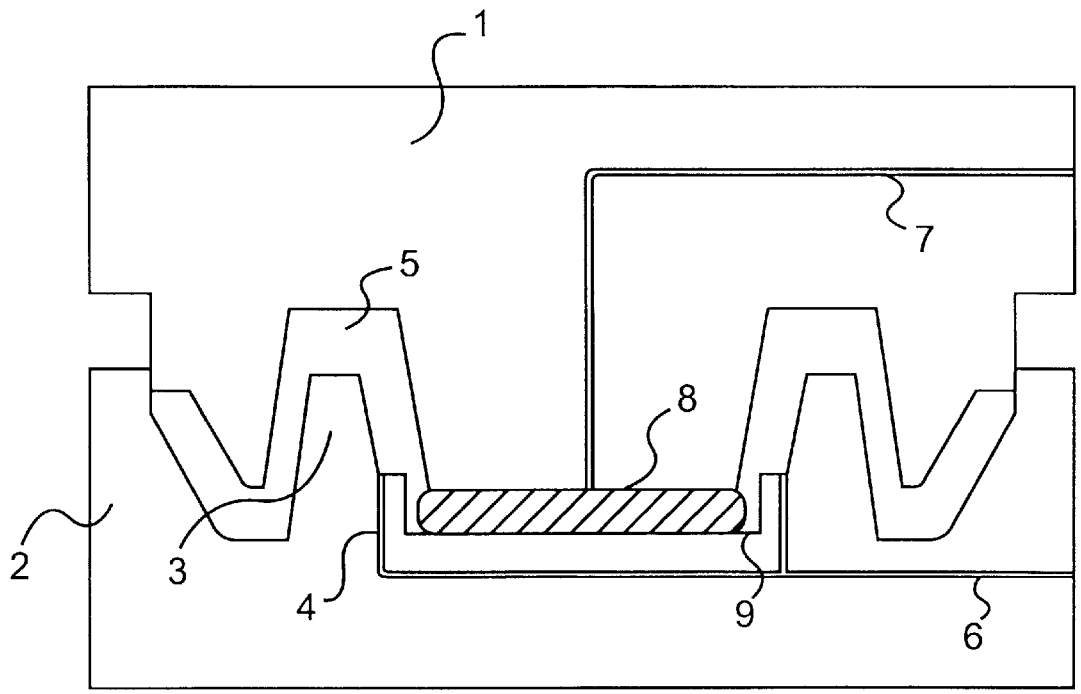
FIGS. 1A and 1B are cross sections of an example of the mold used in the method of the present invention in different steps.

As shown in FIG. 1A, a skin material 9 is placed between unclosed upper and lower molds 1 and 2 with matching edges of the skin material 9 with protruding parts 3 formed on the lower mold 2. The skin material 9 is fixed to the lower mold 2 by sucking the edges of the skin material 9 with a reduced pressure through a gap 4. Then, a resin melt 8 is supplied between the skin material 9 and the upper mold 1, the molds are closed and pressed while cooling to mold the article of the thermoplastic resin.

To avoid damage of the skin material 9, timings of the supply of the resin melt 8 and mold closing are important. The resin melt 8 is supplied through a conduit 7 provided in the upper mold 1 when a clearance between the upper and lower molds is from (C+5) mm to (C+100) mm wherein "C" is a mold clearance when the molding is finished at a mold closing rate of 30 mm/sec. or less. The molds are further closed to the clearance of C mm, pressed for a specific time and cooled to obtain the desired partly laminated multilayer molded article.

The molding method of the present invention produces, with good efficiency, the partly laminated multilayer molded article having the skin material the edges of which are neatly embedded in the grooves of the molded article so that they are beautifully finished. Since an area having the skin material and an area having no skin material are separated by the groove, the molded article has high quality appearance. The molded article produced by the present invention is particularly suitable as an interior part of an automobile.

PREFERRED EMBODIMENTS OF THE INVENTION

The present invention will be illustrated by the following Examples which will not limit the scope of the present invention.

EXAMPLE 1

Figure 1B:
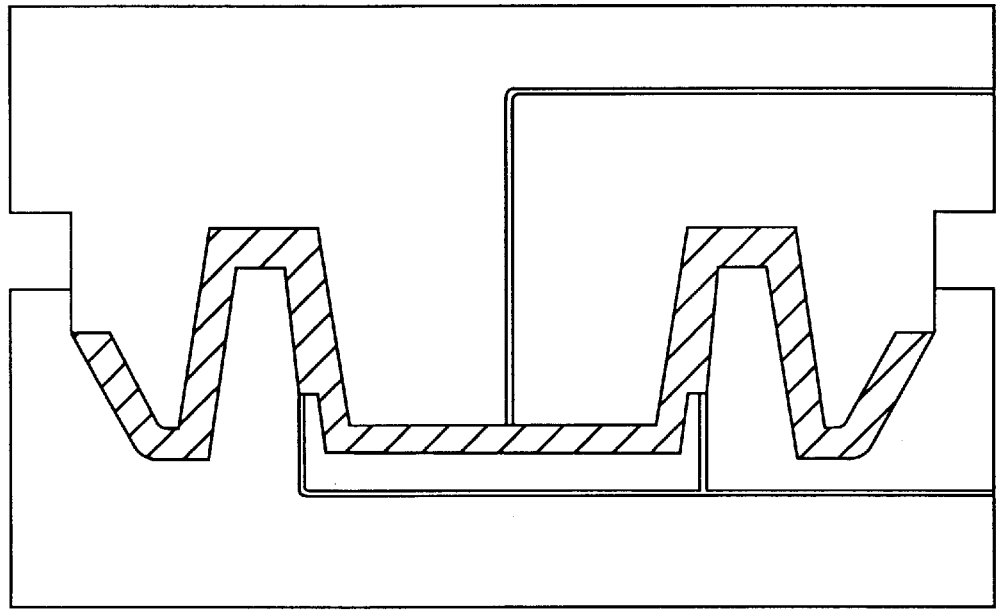
Figure 2A:
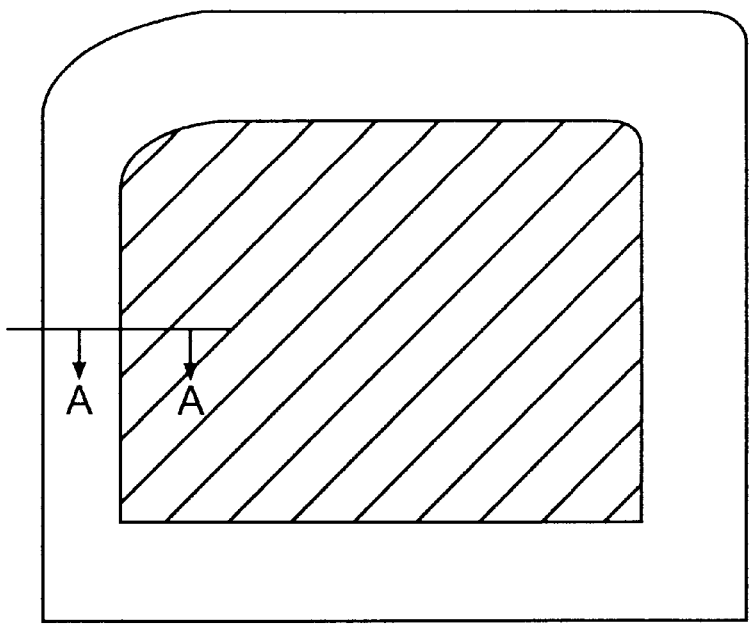
FIG. 2A is a plane view of a multilayer molded article to be produced by the method of the present invention using the mold of FIG. 1.
Figure 2B:
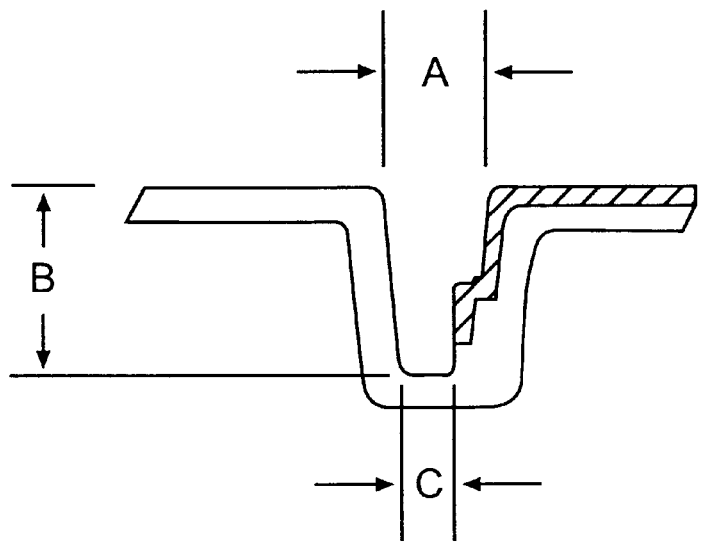
FIG. 2B is a cross section along the line A—A of FIG. 2A.

This Example explains the molding process using the upper and lower molds of FIG. 1 with which a molded article having a plane view of FIG. 2A is formed and which are set in a pressing machine having a clamping force of 300 tons.

As a skin material, an embossed polyvinyl chloride sheet lined with a fabric having a total thickness of 0.7 mm (manufactured by Kyowa Leather Co., Ltd.) was used, which was cut to a size of 650 mm×700 mm.

As a thermoplastic resin, polypropylene containing 15% of talc (Sumitomo Noblen BPZ 5077 manufactured by Sumitomo Chemical Co., Ltd.; Melt flow index of 40 g/10 min.) was used. This resin was molten and supplied in the molds as a resin melt 8 and molded.

The upper and lower molds were maintained at 80° C. and 60° C., respectively.

The skin material was set on the lower mold while matching its edges to the protruding parts 3, and the edges of the skin material 8 were sucked via gaps having a width of 0.05 to 0.1 mm which opened at the protruded part through a suction hole 6, whereby the skin material was absorbed on the lower mold 1.

The lower mold 2 was lifted at a rate of 200 mm/sec. When the cavity clearance reached 15 mm, the lower mold was stopped, and the above thermoplastic resin which had been heated and molten at 230° C. was supplied between the skin material and the upper mold through a resin conduit 7 provided in the upper mold (FIG. 1A).

When the lower mold 2 was further lifted up, the molten resin was supplied to fill the mold cavity (FIG. 1B). Then, the resin melt was compressed and formed. The final clearance between the upper and lower molds was 2.0 mm. After compressing and cooling the resin for 50 seconds, the molds were opened and the molded multilayer article was removed from the molds. The skin material had no wrinkle or breakage, and the edges of the skin material were embedded in the grooves of the molded article so that the article had good appearance.

EXAMPLE 2

Figure 3A:
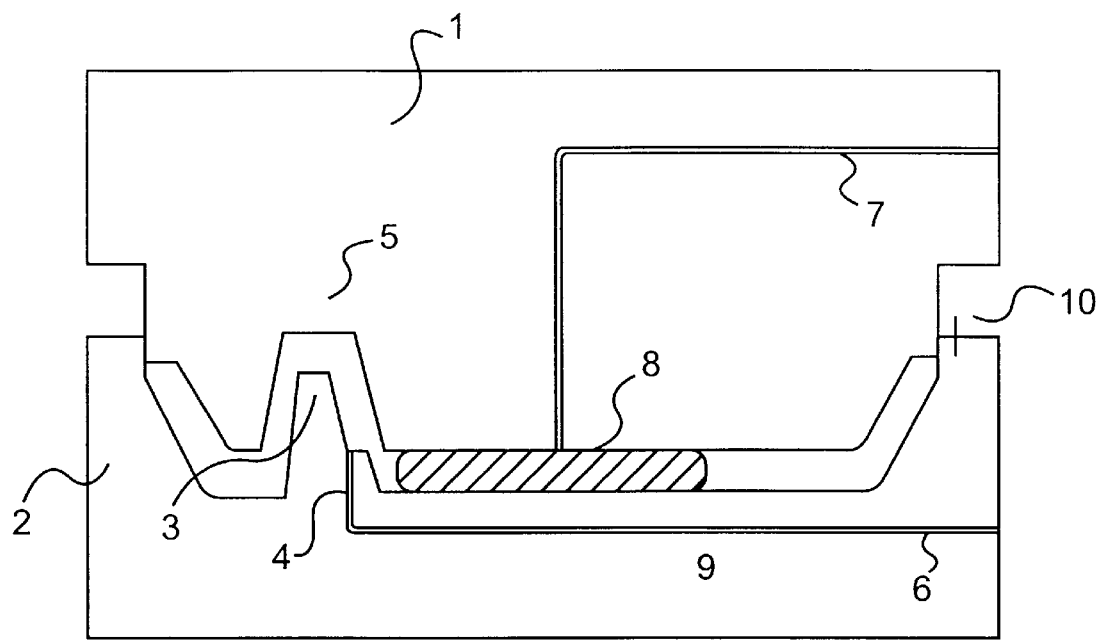
FIGS. 3A and 3B are cross sections of another example of the mold used in the method of the present invention in different steps.
Figure 3B:
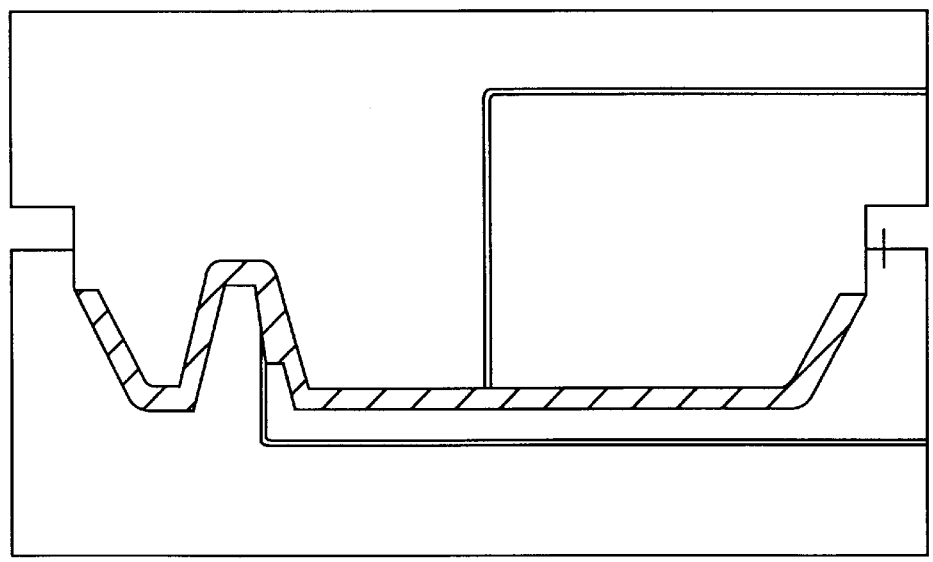
Figure 4:
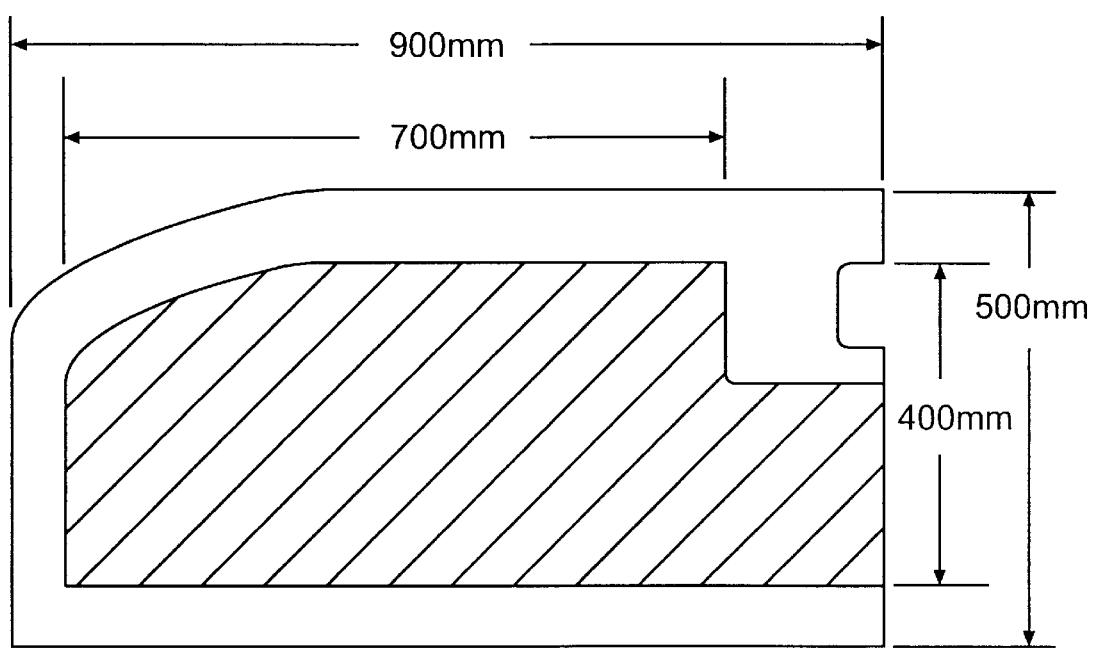
FIG. 4 is a plane view of a multilayer molded article to be produced by the method of the present invention using the mold of FIG. 3.

This Example explains the molding example using the upper and lower molds of FIG. 3 with which a molded article having a plane view of FIG. 4 is formed and which are set in a pressing machine having a clamping force of 300 tons.

As a skin material, an embossed polyvinyl chloride sheet was used having a thickness of 0.4 mm (manufactured by Kyowa Leather Co., Ltd.) which was lined by a polypropylene foam having a thickness of 3.0 mm (manufactured by Toray; an expansion ratio of 15) with an adhesive.

As a thermoplastic resin, polypropylene was used containing 15% of talc (Sumitomo Noblen BPZ 5077 manufactured by Sumitomo Chemical Co., Ltd.; Melt flow index of 40 g/10 min.). This resin was molten and supplied in the molds as a resin melt 8 and molded.

The upper and lower molds were maintained at 50° C. and 40° C., respectively.

The skin material was set on the lower mold while matching its edge to the protruding part 3, and the edge of the skin material 8 was sucked via the gap having a width of 0.05 to 0.1 mm which opened at the protruded part through a suction hole 6, whereby the skin material was absorbed on the lower mold 1. An edge of the skin material which was present outside the article surface was held with a pin 10.

The lower mold 2 was lifted at a rate of 200 mm/sec. When the cavity clearance reached 50 mm, the lifting speed of the lower mold was decrease to 5 mm/sec. and the above thermoplastic resin which had been heated and molten at 190° C. was supplied between the skin material and the upper mold through a resin conduit 7 provided in the upper mold (FIG. 3A). The resin supply was stopped when the clearance reached 25 mm.

When the lower mold 2 was further lifted up, the molten resin was supplied to fill the mold cavity (FIG. 3B). Then, the resin melt was compressed and formed. The final clearance between the upper and lower molds was 3.0 mm. After compressing and cooling the resin for 40 seconds, the molds were opened and the molded multilayer article was removed from the molds. The skin material had no wrinkle or breakage and had a soft and high quality feeling, and the edges of the skin material were embedded in the grooves of the molded article so that the article had good appearance.

What is claimed is:

1. A method for producing a multilayer molded article, which comprises:

disposing a skin material between unclosed upper and lower molds, said lower mold having a protruding part at a location corresponding to an edge of the skin material and said upper mold having a depressed part at a position corresponding to said protruding part of said lower mold;

fixing the position of the skin material by suctioning only said edge of the skin material against a gap formed in said protruding part;

supplying a thermoplastic resin between said upper mold and said skin material containing lower mold; and closing and cooling the molds to thereby form a molded, laminated multilayer article.

2. The method according to claim 1, wherein said gap is formed at an inner peripheral root part of the protruding part.

3. The method according to claim 1, wherein the gap is formed at a stepped portion of said protruding part thereby hiding suction marks formed on the skin material in a non-planar surface portion of the skin material.

4. The method according to claim 1, wherein said step of supplying a melt of a thermoplastic resin includes supplying resin selected from the group consisting of polypropylene, polyethylene, polystyrene, acrylonitrile-styrenebutadiene copolymer, polyamide, ethylene-propylene block copolymer, and styrene-butadiene block copolymer.

5. The method according to claim 4, wherein said thermoplastic resin includes an additive selected from the group consisting of a filler, a pigment, a lubricant, and an antistatic agent.

6. The method according to claim 1, wherein said step of supplying a skin material includes supplying a skin material selected from the group consisting of woven or nonwoven fabric, a net of metal, fiber or a thermoplastic resin, a paper, a metal foil lined with a sheet to be suctioned, a sheet or film of thermoplastic resin, and a thermoplastic elastomer.

7. The method according to claim 1, wherein said protruding part has a width at the root part of from 1 to 10 mm and a height of from 2 to 5 mm.

8. The method according to claim 1, wherein the gap has a width of from 0.05 to 1 mm.

9. The method according to claim 8, wherein said gap is continuous around the inner periphery of said protruding part at the root thereof.

10. The method according to claim 8, wherein said gap is provided at selected intervals around the inner periphery of said protruding part at the root thereof.

11. The method according to claim 1, further including the step of angling a slope of said protruding part at an angle of at least three degrees from a plane of the lower mold.

12. The method according to claim 1, wherein said step of supplying a melt of thermoplastic resin occurs when a clearance between the upper and lower molds is from (C+5)mm to (C+100)mm wherein C is a mold clearance when the molding is completed at a mold closing rate of 30 mm/sec or less.

13. The method according to claim 12, further including the steps of closing the molds to the clearance C, pressing the molds together for a predetermined time and cooling the molds.

* * * * *